United States Patent [19]

Hermann

[11] 3,773,707
[45] Nov. 20, 1973

[54] POLYAMIDE MOLDING COMPOSITION CONTAINING PLAGIOCLASE FELDSPAR

[75] Inventor: Karl Heinz Hermann, Krefeld-Bockum, Germany

[73] Assignee: Bayer Aktiengesellschaft, Leverkusen, Germany

[22] Filed: Mar. 24, 1972

[21] Appl. No.: 237,996

Related U.S. Application Data

[63] Continuation of Ser. No. 8,404, Feb. 3, 1970, abandoned.

[30] Foreign Application Priority Data

Feb. 20, 1969 Germany.................. P 19 08 471.0

[52] U.S. Cl............................................. 260/37 N
[51] Int. Cl............................................. C08g 51/04
[58] Field of Search................................. 260/37 N

[56] References Cited
UNITED STATES PATENTS 3,419,517  12/1968  Hidnibs................................. 260/37
3,344,107  9/1967   Miller................................... 260/37
3,372,137  4/1968   Tierney................................ 260/37

OTHER PUBLICATIONS

Nonmetallic Minerals, Lodoo, 1951 pp. 205–207 USPO Grp. 140.
Cured Rubber and Cpding Ingredients by Pearson, 1918, USPO Library P. 89–90 & 99 Condensed Chemical Dictionary 5th Ed., pp. 474–475, 1961.

Primary Examiner—Morris Liebman
Assistant Examiner—Richard Zaitlen
Attorney—Plumley & Tyner

[57] ABSTRACT

Filler-containing polyamide mixtures of improved impact strength said fillers being minerals from the feldspar group, and a process for the production of said polyamide mixtures. The content of the filler material is of from 1 to 70 percent, preferably of from 10 to 50 percent, by weight based on the total mixture. Additionally, the mixture can contain an organosilicon compound in an amount of from 0.001 to 1 percent by weight, based on the mineral, of the feldspar group as adhesion promoter.

14 Claims, No Drawings

POLYAMIDE MOLDING COMPOSITION CONTAINING PLAGIOCLASE FELDSPAR This is a Continuation, of application, Ser. No. 8,404 filed Feb. 3, 1970 now abandoned.

This invention relates to mixtures of high-melting synthetic polyamides with a mineral filler.

It is known that certain mechanical properties of polyamides can be improved by the addition of inorganic fillers. More particularly, it is possible in this way to increase the tensile strength, flexural strength, notched impact strength and thermal stability under load of the polyamides.

Hitherto, glass and asbestos fibres, titanium dioxide, barium sulphate, talcum, powdered quartz, chalk or calcium carbonate, gypsum or cement have primarily been used as fillers. Unfortunately, these fillers only improve some of the mechanical properties of the polyamides, having a considerable adverse affect on other mechanical properties, above all impact strength. In addition, such fillers as calcium carbonate or glass fibres can only be mixed with a melt of an already-prepared polyamide, by means of suitable mixing machines, extruders in particular. They cannot be added to the polyamide-forming starting materials before polymerisation because calcium carbonate decomposes under the polymerisation conditions, whilst with glass fibres, technical difficulties are encountered, for example in regard to transportation and homogeneously mixing of polyamide melts containing glass fibres.

It is an object of this invention to provide filler-containing polyamide mixtures of outstanding impact strength. This object is accomplished by a composition of matter comprising a polyamide and a mineral from the feldspar group.

Feldspars are anhydrous alkali or lime aluminosilicates, for example orthoclase K [AlSi$_3$O$_8$], microcline K [AlSi$_3$O$_8$], anorthoclase (Na, K) [AlSi$_3$O$_8$] and plagioclases, which are preferably used. Plagioclase is the generic name for all triclinic lime-soda feldspars, that is to say, both the terminal members, albite Na [AlSi$_3$O$_8$] and anorthite Ca [Al$_2$Si$_2$O$_8$], and also their isomorphous mixtures; for example oligoclase containing from 70 to 90 percent by weight of albite and from 30 to 10 percent by weight of anorthite; andesine containing from 50 to 70 percent by weight of albite and from 50 to 30 percent by weight of anorthite; labradorite containing from 30 to 50 percent by weight of albite and from 70 to 50 percent by weight of anorthite; or bytownite containing from 10 to 30 percent by weight of albite and from 90 to 70 percent by weight of anorthite (cf. C.W. Correns, Einfuhrung in die Mineralogie, Berlin 1949, page 165 and pages 358 - 361). Plagioclases have an approximate composition of from 40 to 70 percent by weight of SiO$_2$, from 15 to 40 percent by weight of Al$_2$O$_3$, from 0 to 25 percent by weight of CaO, from 0 to 15 percent by weight of Na$_2$O and less than 1 percent by weight of Fe$_2$O$_3$, MgO and CO$_2$. Of the plagioclases, labradorite is preferably used. The feldspar is used in ground form, with an average particle diameter of less than 0.1 mm and preferably less than 0.05 mm.

The filler-containing polyamide mixtures according to the invention can contain from 1 to 70 percent by weight and preferably from 10 to 50 percent by weight of feldspar, based on the mixture as a whole.

It is another object of this invention to provide a process for the production of filler-containing polyamide mixtures which comprises adding a mineral from the feldspar group to the polyamide material.

Polyamide materials in the context of this invention are polyamides and polyamide forming starting materials.

The feldspar-containing polyamides show, compared with the unfilled polyamides, a very marked increase in flexural strength and compared with filled polyamides, an increase in impact strength to an extent hitherto unattainable when using any other filler. The feldspar-containing polyamide mixtures are best prepared by adding the feldspar to the polyamide-forming starting materials, for example molten caprolactam or an aqueous hexamethylene diammonium adipate solution (AH salt solution) and then carrying out polymerisation or polycondensation in known manner, either in batches, for example in autoclaves, or continuously, for example in VK tubes, optionally in the presence of water or compounds that give off water as catalysts, or in the absence of water using alkaline catalysts.

It is also possible, however, homogeneously to mix the feldspar with molten polyamide by means of a suitable mixer, for example an extruder.

In the context of this invention, polyamides include homopolyamides of the kind obtained by the polymerisation or polycondensation of aminocarboxylic acids or their lactams, for example ε-aminocaproic acid, 11-amino undecanic acid, 4,4-dimethyl azetidinone, β-pyrrolidone, ε-caprolactam, enanthic lactam, caprylic lactam or lauric lactam; or by the polycondensation of diamines, for example ethylene diamine, hexamethylene diamine, decamethylene diamine, dodecamethylene diamine, 2,2,4- and 2,4,4-trimethyl hexamethylene diamine, p- and m-xylylene diamine, bis-(4-aminocyclohexyl)-methane, 3-aminomethyl-3,5,5-trimethylcyclohexyl amine or 1,4-diaminomethyl cyclohexane, with dicarboxylic acids, for example, oxalic acid, adipic acid, sebacic acid, heptadecane dicarboxylic acid, 2,2,4- and 2,4,4-trimethyl adipic acid, isophthalic acid or terephthalic acid; and also copolyamides of the kind obtained by the polymerisation or polycondensation of several of the aforementioned components. Polycaprolactam or its monomer is, however, particularly suitable for the preparation of the polyamide mixtures according to the invention.

In addition to the filler used in accordance with the invention, the polyamides may also contain other conventional additives such as pigments, dyes, light-, heat- and weathering-stabilisers, optical brighteners, plasticisers, crystallisation stimulators, lubricants and release agents and additives for reducing flammability.

Preferably, the filler-containing polyamides also contain, as further additive, from 0.001 to 1 percent by weight, and preferably from 0.01 to 0.5 percent by weight, based on feldspar, of an organosilicon compound acting as adhesion promoter. Examples of adhesion promoters such as these include vinyl trichlorosilane, vinyl triethoxy silane, vinyl-tris-(β-methoxyethoxy)-silane, vinyl trimethoxy silane, vinyl triacetoxy silane, γ-methacryloxypropyl trimethoxy silane, N,N-bis-(β-hydroxyethyl)-γ-aminopropyl triethoxy silane, γ-aminopropyl trimethoxy silane, γ-aminopropyl triethoxy silane, N-β-aminoethyl-γ-aminopropyl trimethoxy silane, β-(3,4-epoxycyclohexyl)-ethyl trimethoxy silane, γ-glycidyl oxypropyl trimethoxy silane and mercaptoethyl trimethoxy silane. γ-aminopropyl trialkoxy silanes are preferably used.

The adhesion promoters may either be applied to the surface of the feldspar before it is mixed with the polyamide-forming starting materials or with the polyamide melt, or alternatively may be added to the polyamide-forming starting materials or to the polyamide melt at any time before, during or after admixture with the feldspar. Adhesion promoters containing carboxyl or primary amino groups, for example β-aminopropyl triethoxy silane, may simultaneously be used as chain terminators.

The filler-containing polyamide mixtures according to the invention are suitable for the production of mouldings of all kinds, for example guard-rings for fans, housings and parts thereof, screws, gear wheels and components in electrical equipment such as coil formers or the bases for keys and contact supports obtained by injection moulding; and bristles, wires, tapes, filaments, sections, plates and tubes obtained by extrusion.

The following examples are to further illustrate the invention without limiting it.

EXAMPLE 1

Mixtures of 10 kg of caprolactam and 300 g of ε-aminocaproic acid, with different quantities of labradorite powder having a particle diameter of less than 0.03 mm and different quantities of γ-aminopropyl triethoxy silane, are polycondensed in the usual way at a temperature of 270°C in an autoclave equipped with stirring mechanism. The polyamide melts are then spun into wires approximately 3mm in diameter and chopped into granulates. The granulates are freed from monomeric components by thorough boiling in water, after which they are dried.

The following characteristics are determined for the products thus obtained:

1. The relative viscosity of a 1 percent by weight solution in m-cresol at 25°C in an Ubbelohde viscosimeter, allowance being made for the filler content by suitably increasing the quantity weighed in.
2. The ash content by burning a sample in an open porcelain crucible and then calcining the combustion residue at 700° to 800°C, the increase in weight of the crucible measured after cooling representing the ash content of the sample.

The products are then processed in a conventional screw injection moulding machine into standard test specimens whose flexural strength is measured in accordance with DIN 53,452 and their impact strength according to DIN 53,453.

The data obtained from the various tests and the measurements taken on the test specimens are set out in Table I.

The following different fillers were used under the same conditions for comparison purposes:

a. kaolin A having a particle diameter of less than 0.04 mm and an average chemical analysis of 86.4 percent by weight of $SiO_2$, 8.5 percent by weight of $Al_2O_3$, 1.8 percent by weight of $K_2O$, 0.7 percent by weight of $Fe_2O_3$, 0.2 percent by weight of MgO, 0.1 percent by weight of $TiO_2$, 0.1 percent by weight of CaO, 0.1 percent by weight of $Na_2O$ and 2.1 percent by weight of heating loss;

b. kaolin B having a particle diameter of less than 0.04 mm and an average chemical analysis of 50.3 percent by weight of $SiO_2$, 32.0 percent by weight of $Al_2O_3$, 1.6 percent by weight of $Fe_2O_3$, 0.8 percent by weight of MgO, 0.6 percent by weight of $TiO_2$, 0.4 percent by weight of CaO, 1.0 percent by weight of $Na_2O$, 7.1 percent by weight of heating residue and 0.5 percent by weight moisture content;

c. talcum C having a particle diameter of less than 0.03 mm and an average chemical analysis of 62.4 percent by weight of $SiO_2$, 31.3 percent by weight of MgO, 0.2 percent by weight of $Al_2O_3$, 0.1 percent by weight of $Fe_2O_3$, 0.2 percent by weight of FeO, 0.3 percent by weight of CaO, 0.5 percent by weight of $CO_2$ and 5.0 percent by weight of water;

d. Muscovite mica D having a particle diameter of less than 0.03 mm and an average chemical analysis of 44.6 percent by weight of $SiO_2$, 37.2 percent by weight of $Al_2O_3$, 10.7 percent by weight of $K_2O$, 1.3 percent by weight of FeO, 0.4 percent by weight of $Fe_2O_3$, 0.6 percent by weight of MgO and 5.2 percent by weight of water;

e. Hornblende Asbestos E having a particle diameter of less than 0.05 mm and an average chemical analysis of 42.2 percent by weight of $SiO_2$, 10.3 percent by weight of $Al_2O_3$ 23.8 percent by weight of MgO, 2.3 percent by weight of $Fe_2O_3$, 8.4 percent by weight of FeO, 0.2 percent by weight of $TiO_2$, 5.6 percent by weight of CaO, 0.4 percent by weight of $CO_2$ and 6.8 percent by weight of water.

TABLE 1

| No. | Filler | Kg. | γ-Aminopropyl-triethoxy silane G. | Percent by weight[1] | Ash content, percent by weight[2] | Relative viscosity | Flexural strength kg./cm.², DIN 53452 | Impact strength cm. kp./cm.², DIN 53453 |
|---|---|---|---|---|---|---|---|---|
| 1 | Labradorite | 4.0 | 4.0 | 0.1 | 29.2 | 3.11 | 1,605 | [3] |
| 2 | do | 5.0 | 7.5 | 0.15 | 34.4 | 2.96 | 1,546 | [3] |
| 3 | do | 6.0 | 6.0 | 0.1 | 39.0 | 3.05 | 1,632 | [3] |
| 4 | do | 8.0 | 8.0 | 0.1 | 45.4 | 3.13 | 1,596 | 73.6 |
| (a) | Kaolin A | 4.0 | 4.0 | 0.1 | 29.6 | 3.15 | 1,325 | 34.0 |
| (b) | Kaolin B | 5.0 | 7.5 | 0.15 | 34.0 | 2.90 | 1,434 | 32.4 |
| (c) | Talcum C | 5.0 | 5.0 | 0.1 | 33.8 | 2.78 | 1,441 | 22.8 |
| (d) | Kaolin B | 7.0 | 7.0 | 0.1 | 41.7 | 2.98 | 1,510 | 31.0 |
| (e) | Muscovite mica D | 4.0 | 4.0 | 0.1 | 29.6 | 2.86 | 1,427 | 28.6 |
| (f) | Hornblende-asbestos E | 4.0 | 4.0 | 0.1 | 28.4 | 2.54 | 1,349 | 28.9 |

[1] Based on the filler.
[2] Based on the polyamide/filler mixture.
[3] Did not break.

EXAMPLE 2

10 kg samples of a colourless polycaprolactam prepared in the usual way with a relative viscosity of 3.12 (as measured on a 1 percent by weight solution in m-cresol at 25°C in an Ubbelohde viscosimeter) are fused in a conventional extruder and at the same time homogeneously mixed with different quantities of the labradorite powder referred to in Example 1 and different quantities of γ-aminopropyl triethoxy silane. The resulting filler-containing polycaprolactam samples are spun into wires approximately 3 mm in diameter, chopped into granulates and dried.

The relative viscosity and ash content of the products thus obtained are measured as described in Example 1. In addition, the products are injection moulded into standard test specimens, again as described in Example 1, and their flexural strengths and impact strengths are measured.

The results of the various tests and the measurements taken on the test specimens are set out in Table II.

The following different fillers were used under the same conditions for comparison purposes:
a. kaolin A, as in Example 1
b. talcum C, as in Example 1
c. dolomite D, with a particle diameter of less than 0.03 mm containing approximately 99.5 percent by weight of CaMg (CO$_3$)$_2$;
d. glass fibres E, with a diameter of approximately 0.01 mm and an average fibre length of approximately 0.3 mm
e. Muscovite mica D, as in Example 1.

TABLE II

| No. | Filler | Kg. | γ-aminopropyl-triethoxy silane | | Ash content, percent by weight² | Relative viscosity | Flexural strength, kg./cm.², DIN 53452 | Impact strength, cm. kp./cm.² |
|---|---|---|---|---|---|---|---|---|
| | | | G. | Percent by weight¹ | | | | |
| 1 | Labradorite | 2.5 | 2.5 | 0.1 | 20.8 | 3.08 | 1,319 | (³) |
| 2 | do | 4.0 | 4.0 | 0.1 | 28.9 | 3.10 | 1,363 | (³) |
| 3 | do | 6.0 | 9.0 | 0.15 | 37.6 | 3.07 | 1,416 | 76.2 |
| (a) | Kaolin A | 4.0 | 4.0 | 0.1 | 29.2 | 3.05 | 1,216 | 28.2 |
| (b) | Talcum C | 4.0 | 4.0 | 0.1 | 28.3 | 3.07 | 1,277 | 36.5 |
| (c) | Dolomite F | 4.0 | 4.0 | 0.1 | 15.2 | 2.86 | 860 | 53.7 |
| (d) | Glass fibre G | 4.0 | 4.0 | 0.1 | 29.0 | 3.09 | 1,865 | 32.1 |
| (e) | Muscovite mica D | 4.0 | 6.0 | 0.15 | 27.6 | 2.94 | 1,398 | 26.9 |

¹ Based on the filler.
² Based on the polyamide/filler mixture.
³ Did not break.

What we claim is:

1. A composition of matter comprising a resinous polyamide and from 1 to 70 percent by weight based on the total composition of a mineral from the plagioclase feldspar group having an average particle diameter of less than 0.1 mm.

2. The composition according to claim 1, wherein said mineral from the plagioclase feldspar group has an average particle diameter of less than 0.05 mm.

3. The composition according to claim 1, wherein the content of said mineral from the plagioclase feldspar group is of from 10 to 50 percent by weight based on the total composition.

4. The composition according to claim 1, wherein the plagioclase feldspar is labradorite.

5. A composition of matter according to claim 1, comprising a polyamide, a mineral from the plagioclase feldspar group and additionally an organosilicon compound as adhesion promoter.

6. The composition according to claim 5, wherein the content of said organosilicon compound is of from 0.001 to 1 percent by weight based on said mineral from the plagioclase feldspar group.

7. The composition according to claim 5, wherein the content of the organosilicon compound is of from 0.01 to 0.5 percent by weight based on said mineral from the plasioclase feldspar group.

8. The composition according to claim 5, wherein said organosilicon compound is a γ-aminopropyl trialkoxy silane.

9. The composition according to claim 1, wherein said polyamide is polycaprolactam.

10. The composition of matter of claim 1 in which said polyamide is polycaprolactam, said plagioclase feldspar is labradorite having a particle size of less than 0.05 mm., labradorite comprising 1 percent to 70 percent by weight of the composition said composition also containing 0.01 to 0.5 percent by weight based on the labradorite of γ-aminopropyl triethoxy silane.

11. A process for the production of filler-containing polyamide mixtures which comprises adding to polyamide material 1 to 70 percent by weight based on the total composition of a mineral from the plagioclase feldspar group having an average particle diameter of less than 0.1 mm.

12. The process according to claim 11, wherein said polyamide material is a polyamide melt.

13. The process according to claim 11, wherein said polyamide material is a melt of polyamide-forming starting material and polymerising the mixture thus obtained.

14. The process according to claim 11, wherein an organo-silicon compound is added as adhesion promoter to said mineral from the plagioclase feldspar group before said mineral is added to the polyamide material.

* * * * *